Nov. 30, 1948.  S. R. HARTSTEIN ET AL  2,454,800
INSULATED ELECTRIC CABLE AND INSULATION THEREFOR
Filed Aug. 4, 1945

INVENTORS
SIDNEY R. HARTSTEIN
FRED STOLTE
BY
ATTORNEY

Patented Nov. 30, 1948

2,454,800

UNITED STATES PATENT OFFICE 2,454,800

INSULATED ELECTRIC CABLE AND INSULATION THEREFOR

Sidney R. Hartstein, New Brunswick, N. J., and Fred Stolte, St. Albans, N. Y., assignors to Federal Telephone and Radio Corporation, New York, N. Y., a corporation of Delaware Application August 4, 1945, Serial No. 608,875

18 Claims. (Cl. 174—28)

The present invention relates to electric cable insulation and involves not only the nature of the insulating or dielectric material used but also electric cables with which said insulating material is used. More particularly the invention is concerned with electric cables wherein a substantial part of dielectric material in the envelope surrounding a conductor and preferably close thereto, consists of a suitable gas, such as air. Cables of this character are used, particularly for transmitting currents of relatively high frequency, for communication purposes, among others. Cables of this sort may be selected because their construction is conducive either to low dielectric loss or to low capacity between the conductor and surrounding conductive bodies, or to both. Obviously the greater the amount of air (dielectric constant 1.0006) in the insulation, the nearer the value of the dielectric constant of the insulation and of the cable, approaches that of air.

An important object of the invention is to provide novel and advantageous cable insulation whereby a cable provided with said insulation will have a low dielectric constant.

Another object of the invention is to provide novel and advantageous cable insulation containing distributed therethrough, sufficient air to provide a low dielectric constant for the cable.

In carrying out the invention according to one embodiment, it is necessary to select a suitable filler or a suitable filling material containing a substantial quantity of air or other suitable gases. This requirement is met very satisfactorily by selection of diatomaceous silica or diatomaceous earth which contains a substantial amount of air. Said diatomaceous silica or earth comprises accumulated deposits of cell-walls of diatoms and as prepared for use is light, soft and adsorbent, and due largely to its porosity and adsorbing qualities, contains air in the general range of 75% to 95% by volume. Obviously this material is very bulky.

The air-retaining or air-carrying material selected may be used with other material which serves to hold it in effective position around conducting means extending along the axis of the cable.

The air-retaining material may be used as a filler in combination with suitable binding material which may be considered as a matrix. In this case the percentage of the filler by weight must be limited sufficiently to avoid structural breakdown of the binder or matrix, that is the percentage of binder material must be large enough to hold the material together.

According to another form of the invention the insulation comprising air-carrying material may be confined in a cable sheath in which the conducting means may be maintained in general axial position in any suitable manner.

The binder may be of rubber or any other suitable material such as natural or synthetic hydrocarbon plastics.

Other objects, features and advantages will appear upon consideration of the following detailed description and of the drawings, in which Fig. 1 is a somewhat diagrammatic cross-section of an electric cable embodying one form of the invention;

Figure 1:
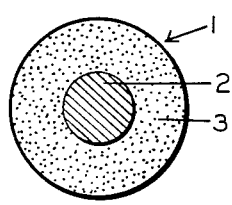

In Fig. 1 there is illustrated diagrammatically an electric cable 1, comprising an axial wire conductor 2 enclosed in an insulating tubular body 3. The axial conductor may be a single wire or may consist of a plurality of wires stranded together or of a plurality of wires arranged side by side in generally parallel arrangement. According to the present invention it is desired to have as much air as practicable in the insulating tube or sleeve. This result may be attained by using in the tube a filler which is porous and/or contains a suitable gas or gases, such as air.

Among the binders which may be used advantageously, with the diatomaceous silica or the like, are rubber, polyethylene, polystyrene and polyvinyl resin compositions. The binding material may be in a liquid or semi-liquid state while being combined with the filler and depending upon the nature of the binder. Said liquid or semi-liquid state may be obtained by use of solvents, by emulsifying, or by softening by the use of plasticizers and/or heat. Of course, plasticizers used or other material added should have low loss characteristics.

The conductor 2 may be covered with an envelope 3 of the filler incorporated in a matrix of binding material which is high in insulating value and is both tough and flexible. This binding material may be of rubber, of polyethylene, of polystyrene, or of other organic matrices.

The optimum range of the filler, diatomaceous silica for example, may be from 10 to 35% by weight of the filler and matrix, and for rubber, etc. the optimum range may be extended to 10% to 60%. Of course other substances may be included in the binder.

Figure 2:
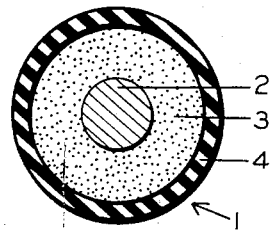
Fig. 2 is a view similar to Fig. 1 of a modified form of cable according to the present invention.
Figure 3:
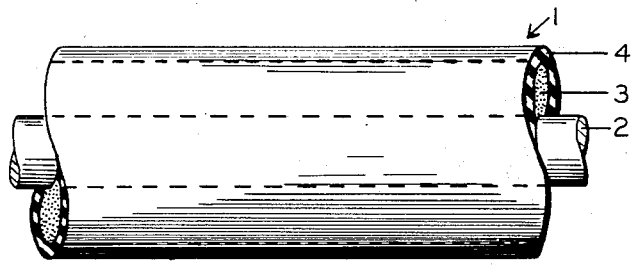
Fig. 3 is an elevation showing a longitudinal portion of the cable of Fig. 2.

The envelope 3 (Figs. 2 and 3) may also be enclosed in an insulating tube 4, made for example of any one of said binders. When the tube 4 is used, it may be possible to reduce the amount of binding material for the filler in envelope 3.

Figure 4:
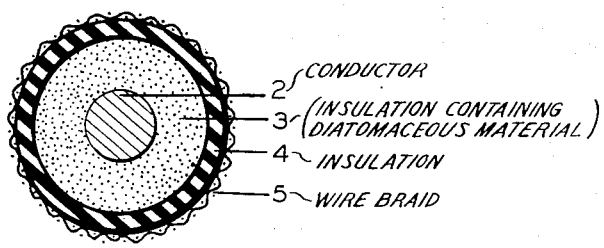
Fig. 4 is a cross-section of another modified form of cable according to the present invention.

As indicated in Fig. 4, the tube 4 may be inclosed in a metal cover 5 such as a wire braid or a wire-braided tube.

Although three embodiments of the invention have been shown and described for the purpose of illustration, modifications occurring to those skilled in the art may be made without departing from the scope of the invention as defined in the appended claims.

What is claimed is:

1. In an electric cable having a longitudinal conductor, insulation surrounding said conductor and comprising finely divided air-retaining diatomaceous silica incorporated in a binder of strong and flexible insulating material.

2. The combination according to claim 1 wherein the diatomaceous silica contains about 75% to 95% by volume of air and is within an optimum range of 10% to 35% of said insulation in weight.

3. In an electric cable having a longitudinal conductor, an insulating envelope surrounding said conductor and comprising a layer including finely divided air-retaining material constituting at least 10% by weight of said envelope, and a binder of strong and flexible insulating material in which said air-retaining material is incorporated.

4. The combination according to claim 3 wherein said binder is an organic matrix.

5. The combination according to claim 3 wherein said binder is of rubber material.

6. The combination according to claim 3 wherein said binder comprises a polymerized material derivable from polyethylene.

7. The combination according to claim 3 wherein the binder comprises polymerized material derivable from polystyrene.

8. In an electric cable having a longitudinal conductor, an insulating envelope comprising air-retaining material around said conductor constituting at least 10% by weight of said envelope, and means for holding said envelope in position on the conductor including a tube enclosing said envelope.

9. The combination according to claim 8 wherein the tube enclosing said envelope is of insulating material.

10. The combination according to claim 8 wherein the tube engaging said envelope is of metal.

11. The combination according to claim 8 wherein the tube enclosing said envelope is of insulating material and around said tube is a tubular metallic cover.

12. The combination according to claim 8 wherein the material of the tube enclosing said envelope is a polymer derivable from ethylene.

13. The combination according to claim 8 wherein the material of the tube enclosing said envelope is polyethylene.

14. The combination according to claim 8 wherein the material of the tube enclosing said envelope is polystyrene.

15. The combination according to claim 8 wherein the material of the tube enclosing said envelope is rubber.

16. An electric cable comprising a longitudinal conductor, insulation surrounding said conductor comprising a tubular body containing diatomaceous-silica material and a tubular metallic envelope around said insulation.

17. In an electric cable having a longitudinal conductor, an insulating envelope surrounding said conductor and comprising finely divided air-retaining material having an air content in excess of 50% by volume, said material being incorporated in a binder of strong and flexible material.

18. In an electric cable having a longitudinal conductor, an insulating envelope surrounding said conductor and comprising finely divided air-retaining material having an air content in excess of 50% by volume, said material being incorporated in a binder of strong and flexible material, and a tube surrounding the said envelope.

SIDNEY R. HARTSTEIN.
FRED STOLTE.

REFERENCES CITED

The following references are of record in the file of this patent:

UNITED STATES PATENTS

| Number | Name | Date |
| --- | --- | --- |
| 1,102,633 | Aylsworth | July 7, 1914 |
| 1,127,281 | Read | Feb. 2, 1915 |
| 1,899,752 | Estorff | Feb. 28, 1933 |
| 1,938,308 | Weigand | Dec. 5, 1933 |
| 2,085,995 | Patnode et al. | July 6, 1937 |
| 2,249,959 | Johannessen | July 22, 1941 |
| 2,375,388 | Ryan | May 8, 1945 |
| 2,391,686 | McLean | Dec. 25, 1945 |